Figure 2:
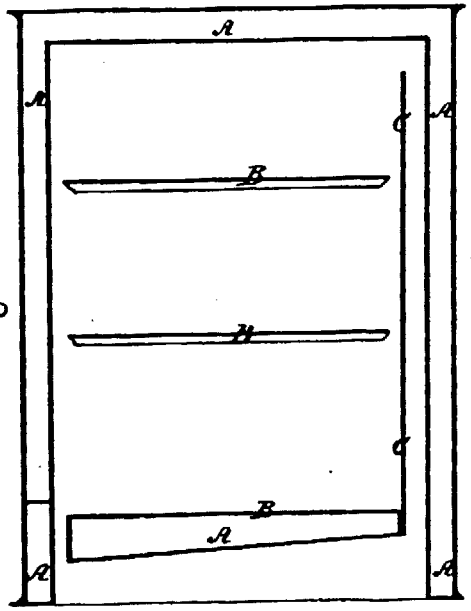
Figure 1:
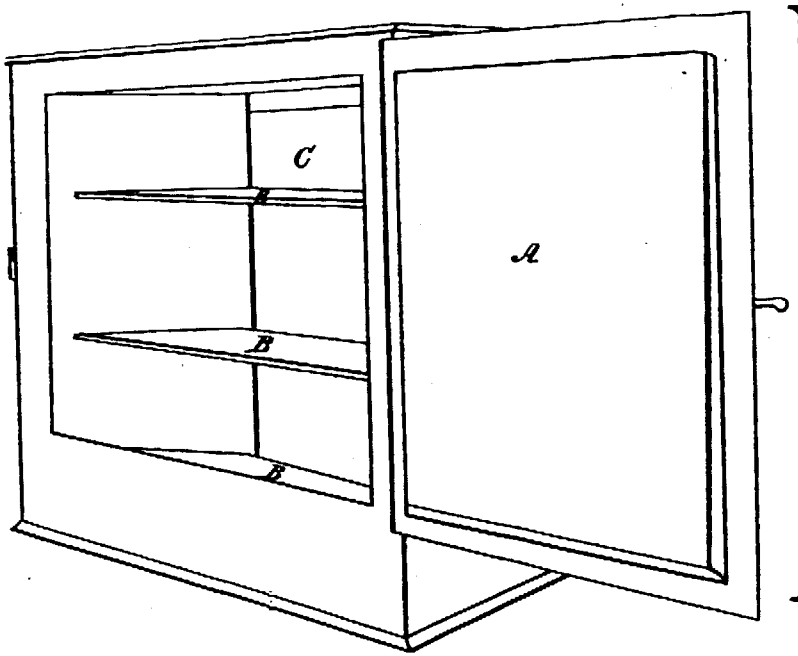

7860X

J. S. Gold.

Domestic Oven.

Patented Dec. 16, 1833.

N. PETERS, PHOTO-LITHOGRAPHER, WASHINGTON, D. C.

7860X Dec 16 1833

J. Swift Gold of Norwich Connecticut

Letters Patent.

The schedule referred to in these Letters Patent and making part of the same containing a description in the words of the said J. Swift Gold himself of his improvement called the Union Oven.

To all to whom these presents shall come. Be it known that I J. Swift Gold of Norwich in the County of New London and State of Connecticut, have invented a new and useful improvement in an oven, which improved oven is designated and called "J. Swift Golds Union Oven;" and that the following is a full and exact description of said improvement as invented by me.

The peculiar advantages that this oven possess are that it applies all, or nearly all the heat which is produced by the combustion of the fuel to the purposes of baking, the heat being secured from escaping or being lost, by means of confined air; as herein after described, and a circulation of heat by means of heated air within the oven is produced and continued until the baking is completed.

[margin: Re-issued 16 August 1832]

The oven is most easily constructed of a square form, with but one door and without any bottom, as when used it may be placed on the top of a stove, or other heated iron plate. but it may be made with more than one door, and in any other form. * It should be made of tin, thin sheet iron or other thin metal plate, and that with a bright surface is to be preferred, by its being thin less heat will be absorbed by it and in that way lost, and by its being of a bright surface, the heat is more effectually retained where it is designed to operate.

The oven may be thus constructed: Let two ovens be made with sides & top, and of the same height, but the one of them less length and breadth than the other, say one inch each way, this difference being sufficient to produce the required effect, though this difference may be increased in the construction if desired. Let the lower edge of the smaller one be turned outward at right angles with the sides for the width of

7860 X half an inch to this extent reducing its height. The larger one being now
placed over the smaller one the edges of the two will be in contact and they
are to be united by rivets or wires or some other secure way. A double
oven is thus formed with the space of half an inch between the respec
tive plates which space will be filled with confined air, a door would
then be cut and the edges of the plates united at the opening in the same
way as before mentioned. A double door of the same thickness, that
is with the same space for confined air between its plates is then to
be added. The confined air with which the inner oven is now sur
rounded at the top and sides being a slow and imperfect conductor of
heat, the heat arising from the iron plate on which the oven shall be
placed will be secured from escape and will be expended in the pro
cess of baking. By means of grooves on the sides of the oven, or by
hooks, shelves or grates may be placed within the oven but they
must be so arranged as to admit the heat to arise between and around
the articles to be baked on the shelves or grates, and pervade the whole
oven. Though the circulation of heat and air as hereinafter men
tioned is regarded as an improvement, the oven may be used as above
described very advantageously without it. By means of a regular
circulation of heat within the oven a greater effect may be produced
from the same consumption of fuel. This circulation of the heat may
be thus produced at the distance from the backside of the inner oven
of one twelfth part of its depth, let a sheet of tin or other metal be
secured passing from side to side the upper edge of it reaching to with
in the same distance of the top of this oven, and the lower edge of it
within two or three inches of its bottom. From the lower edge of this
plate let another extend three quarters across towards the opposite side
of the oven, in the form of an inclined plane, with a descent of about
one inch in twelve. another sheet in a horizontal position may be uni
ted with this inclined one above it in such ... manner as to enclose
between the two, a quantity of confined air thus forming a shelf for
baking and at the same time securing the articles to be baked from be
ing scorched from the iron plate. The heat arising from the iron

7860X plate by means of the inclined planes, will be carried to the back side of the perpendicular sheet and will then ascend with a current of heated air to the top of the oven: and as the heat shall be absorbed by the articles in baking the air becoming more condensed will descend in the oven the shelves being so arranged that in its descent it shall pass over all the articles to be baked.

The two distinct improvements claimed in this oven and which are intended to be secured are first the prevention of the loss of heat by means of the confined air: and second the increased effect from the circulation of the heat and air within the oven. As the heat is so intense within the oven as to dissolve the solder the grate and shelves and all the other parts of the inner oven. must in its construction be secured by rivets hooks, wires grooves. or interlashing, or some other way not effected by the action of the heat. The use of tin in the construction of the oven is recommended for the inner oven by its being so thin, it absorbs but little heat: while in the exterior oven the inner surface will never tarnish and the outer one may always be kept bright, thus increasing the security against the escape of heat.

J. Swift. Gold [illegible]

Witnesses
Thomas Waring
B. F. Gold.

(1162 words)

(Patented 16 December 1833)
(Dr in portfolio)